United States Patent
Fuse et al.

(10) Patent No.: US 8,203,920 B2
(45) Date of Patent: Jun. 19, 2012

(54) INFORMATION RECORDING DEVICE, METHOD, AND COMPUTER PROGRAM

(75) Inventors: Shoji Fuse, Iruma (JP); Junichi Furukawa, Kawasaki (JP); Hiroshi Nishiwaki, Kawasaki (JP); Yoshio Sasaki, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 170 days.

(21) Appl. No.: 12/680,369

(22) PCT Filed: Sep. 28, 2007

(86) PCT No.: PCT/JP2007/069012
§ 371 (c)(1),
(2), (4) Date: May 6, 2010

(87) PCT Pub. No.: WO2009/040936
PCT Pub. Date: Apr. 2, 2009

(65) Prior Publication Data
US 2010/0302922 A1     Dec. 2, 2010

(51) Int. Cl.
*G11B 15/52* (2006.01)
(52) U.S. Cl. .................... 369/47.51; 369/53.27
(58) Field of Classification Search .................. None
See application file for complete search history.

(56) References Cited

U.S. PATENT DOCUMENTS

| | | |
|---|---|---|
| 2003/0035355 A1 | 2/2003 | Morishima |
| 2003/0063335 A1 | 4/2003 | Mandel et al. |
| 2005/0068871 A1 | 3/2005 | Weirauch |
| 2005/0099914 A1 | 5/2005 | Shoji et al. |
| 2005/0099915 A1 | 5/2005 | Shoji et al. |
| 2005/0232107 A1 | 10/2005 | Shoji et al. |
| 2007/0019522 A1 | 1/2007 | Shoji et al. |
| 2007/0030778 A1 | 2/2007 | Shoji et al. |

FOREIGN PATENT DOCUMENTS

| | | |
|---|---|---|
| JP | 3159454 | 2/2001 |
| JP | 2002-358648 | 12/2002 |
| JP | 2003-059047 | 2/2003 |
| JP | 2005-100614 | 4/2005 |

OTHER PUBLICATIONS

International Search Report, PCT/JP2007/069012, Jan. 8, 2008.

*Primary Examiner* — Paul Huber
(74) *Attorney, Agent, or Firm* — Young & Thompson

(57) ABSTRACT

An information recording apparatus (1) is provided with: a recording device (102) for recording information onto an information recording medium (100) by irradiating the information recording medium with a recording laser beam (L); a controlling device (103) for recording calibration data onto the information recording medium by using the recording laser beam in which the power is adjusted gradually; and a detecting device (107) for detecting with a push-pull signal after the recording of the calibration data, the recording of the calibration data being ended if the push-pull signal exceeds a predetermined range, an optimum power of the recording laser beam being determined from a jitter amount included in a reproduction signal.

12 Claims, 5 Drawing Sheets

[FIG. 1]
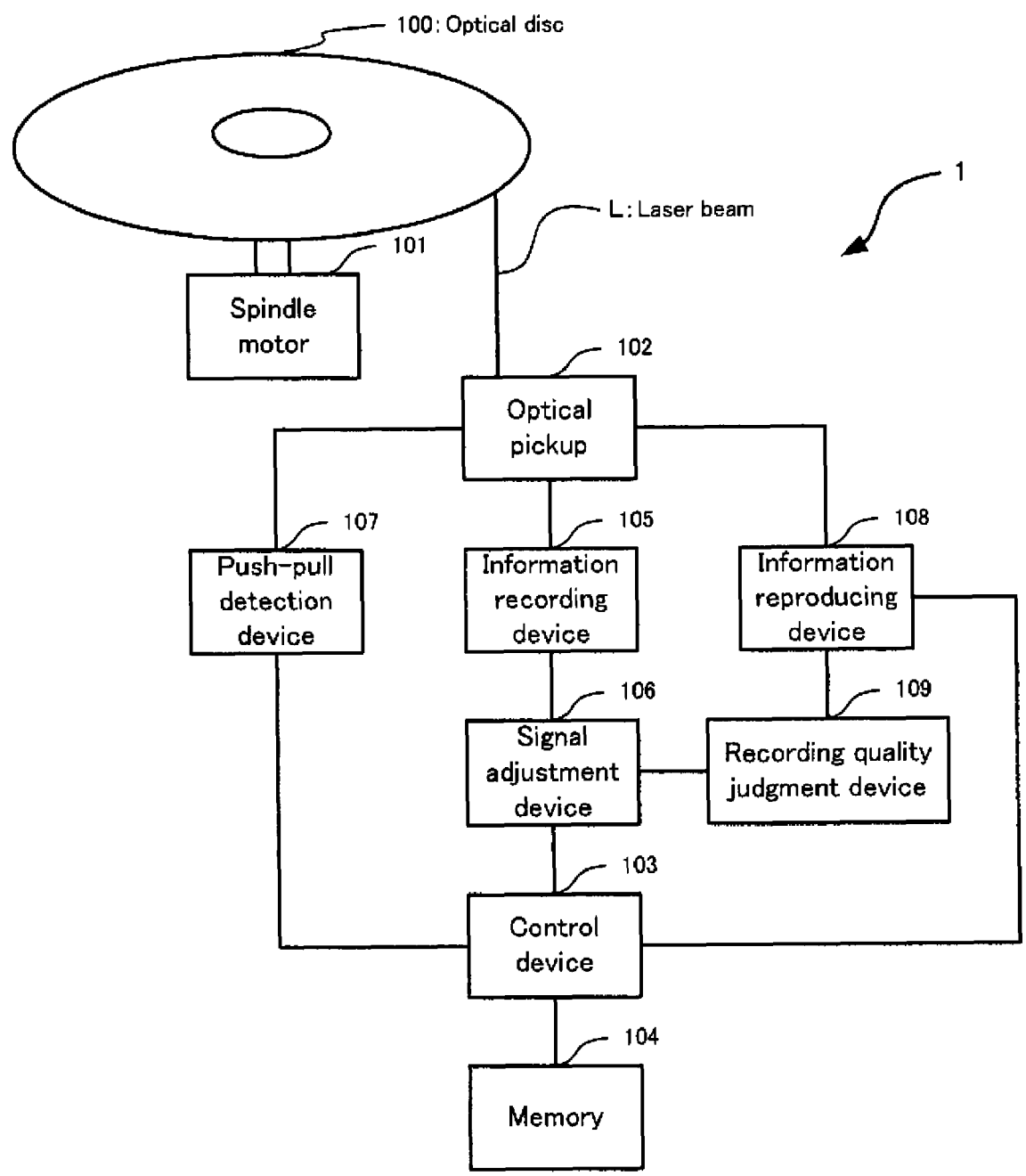

[FIG. 2]
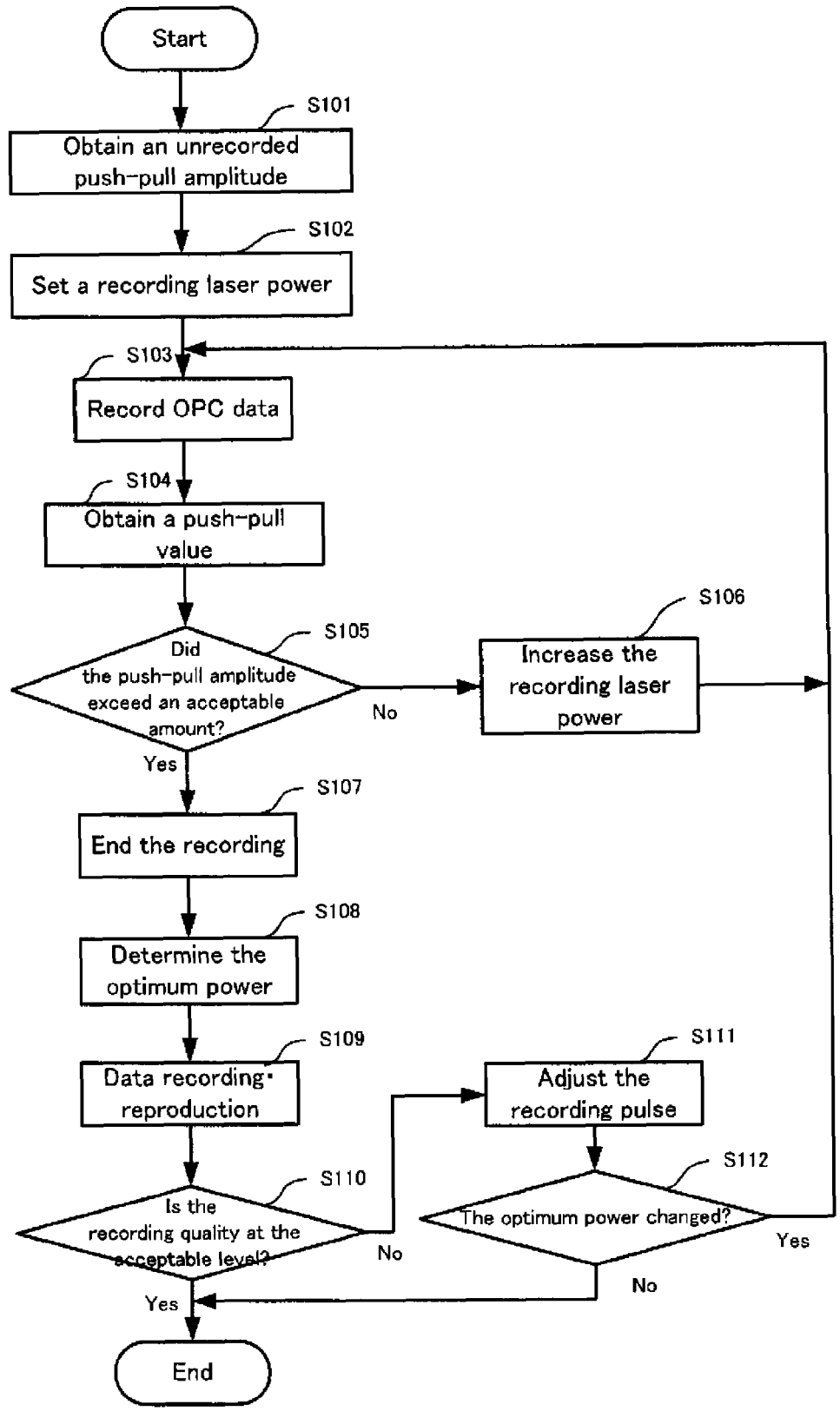

[FIG. 3]
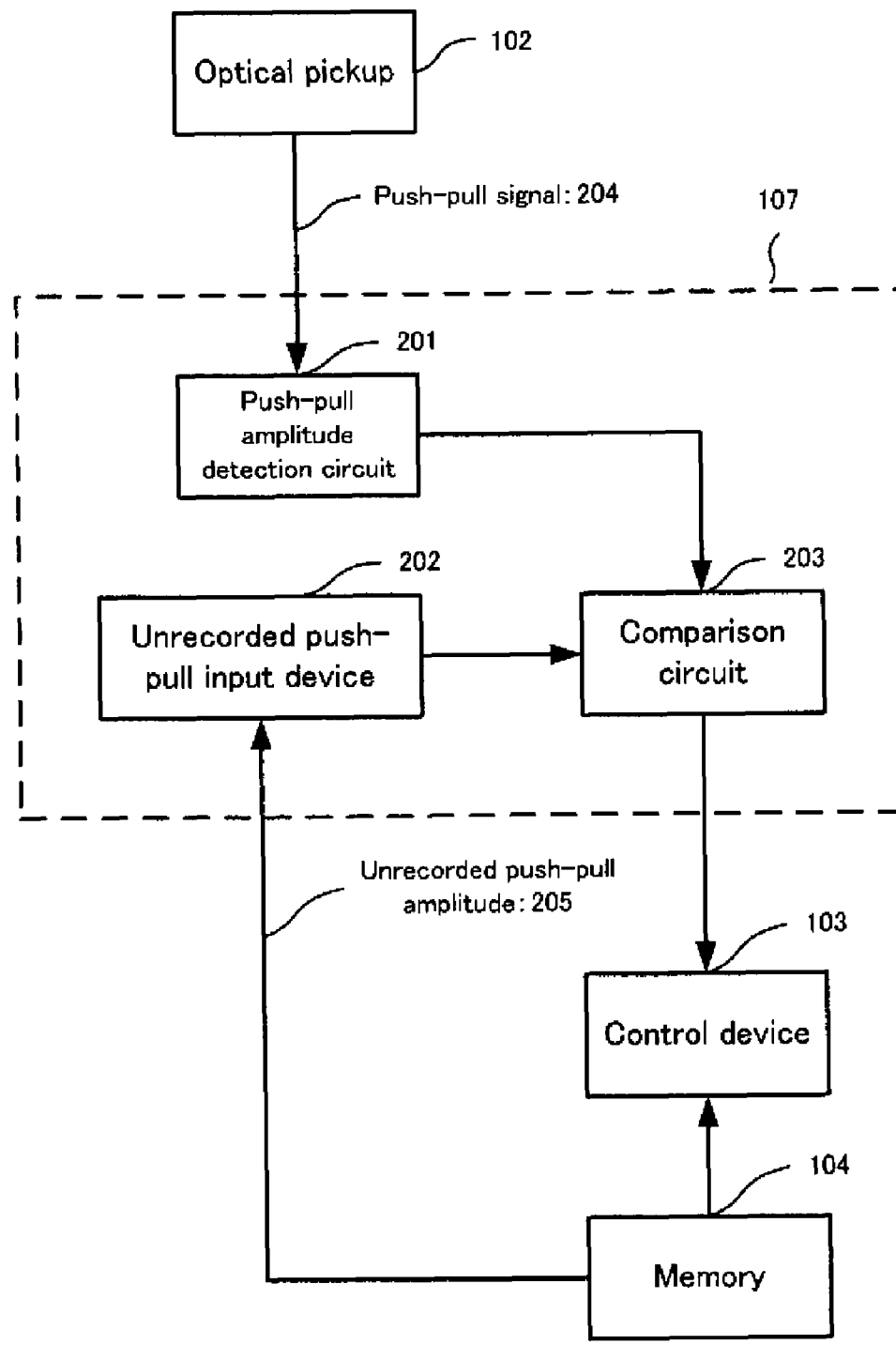

[FIG. 4]
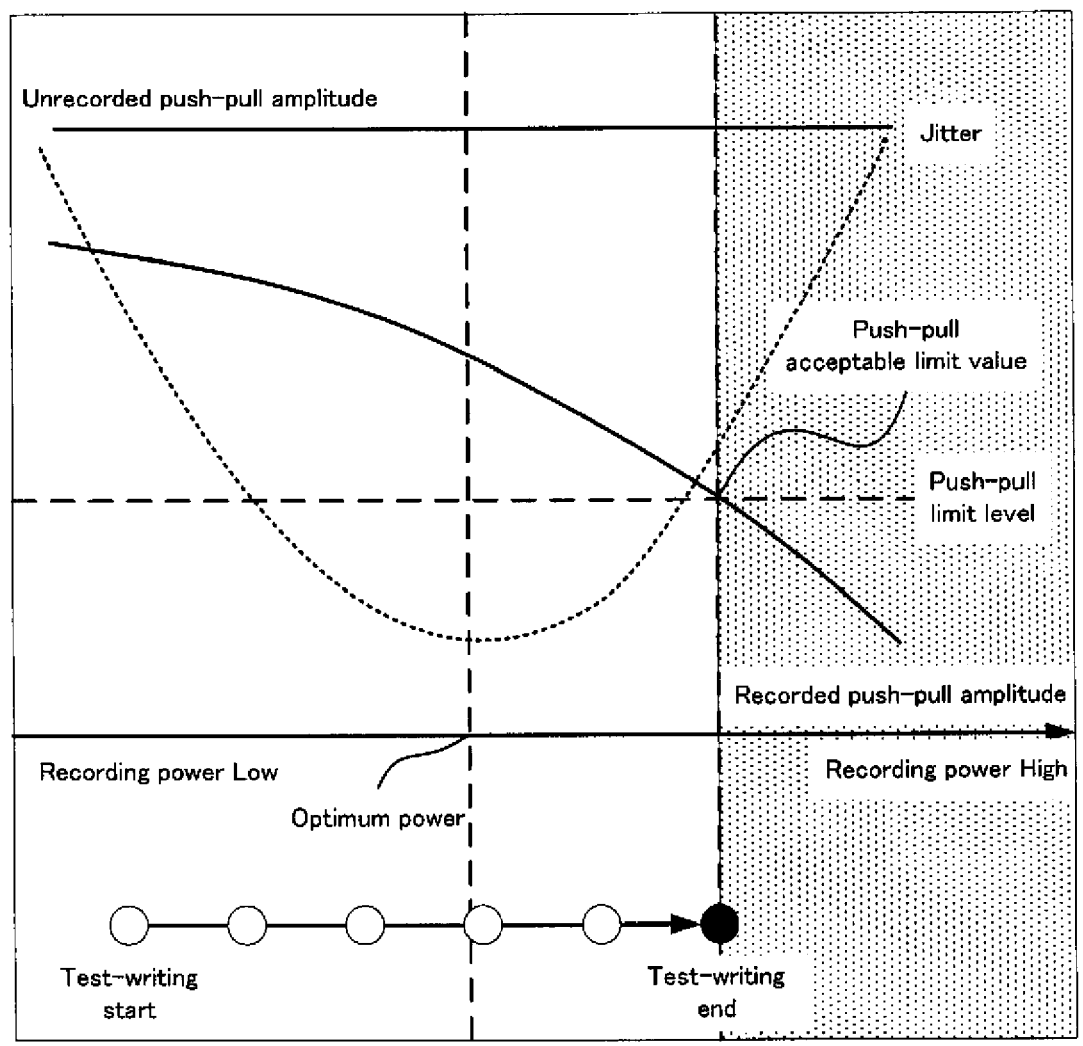

[FIG. 5]
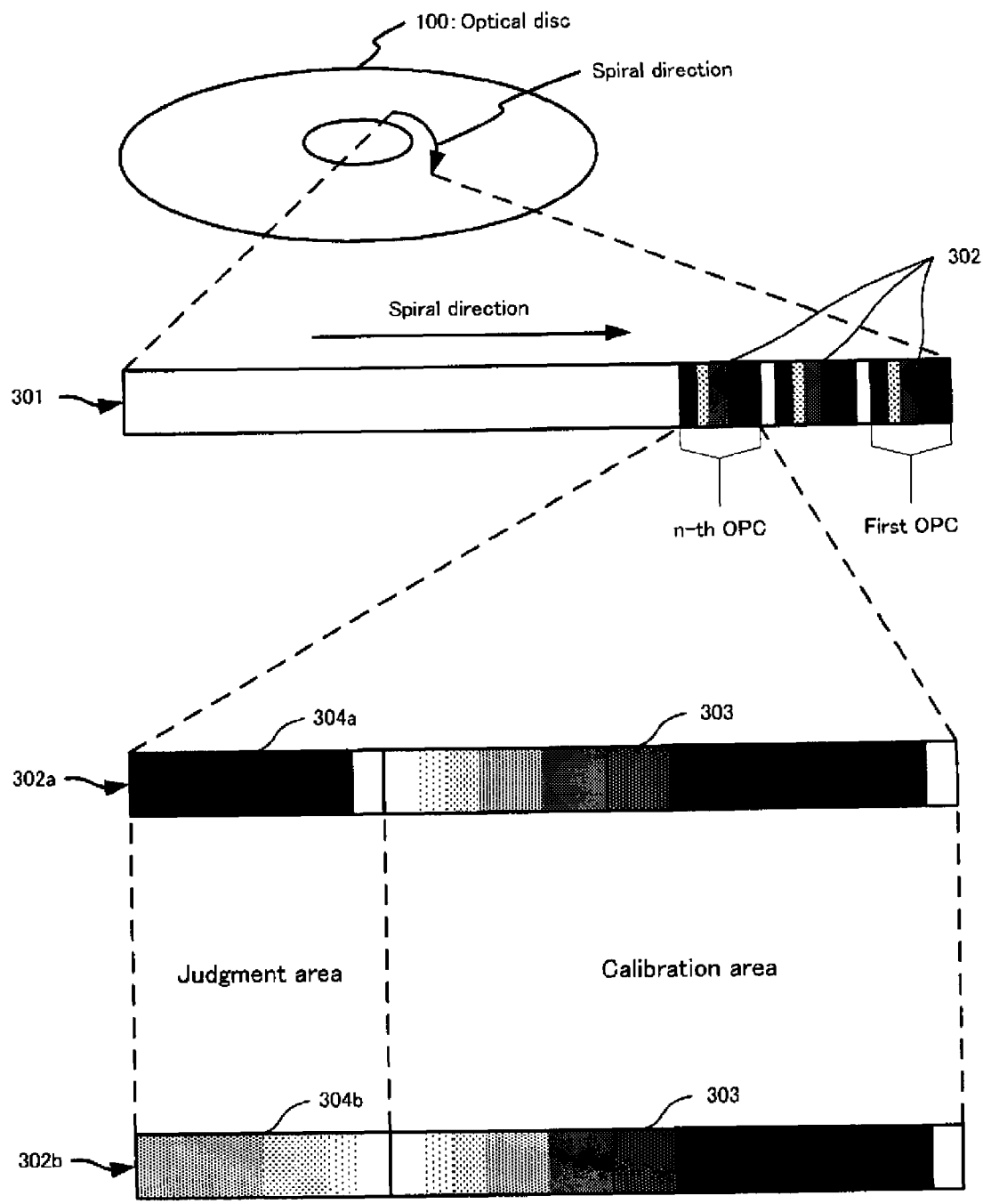

INFORMATION RECORDING DEVICE, METHOD, AND COMPUTER PROGRAM

This application is a 371 of PCT/JP2007/069012, filed Sep. 28, 2007.

TECHNICAL FIELD

The present invention relates to an information recording apparatus and method, such as a DVD recorder, and a computer program which makes a computer function as the information recording apparatus.

BACKGROUND ART

In an information recording/reproducing apparatus for recording data onto an information recording medium, for example, such as an optical disc, the optimum power of a recording power is set by an OPC (Optimum Power Control) process in accordance with the type of the optical disc, the type of the information recording/reproducing apparatus, a recording speed, or the like. In other words, the recording power is calibrated. This can realize an appropriate recording operation in response to variations in property of the information recording surface of the optical disc, or the like. For example, when the optical disc is loaded and a writing command is inputted, the light intensity of a recording laser beam is changed sequentially and gradually, and OPC data is recorded into an OPC area; namely, a so-called test-writing process is performed. After that, the OPC data recorded in this manner is reproduced, and this reproduction result is judged by a predetermined evaluation criterion to obtain the calibration value (e.g. optimum recording power) of the recording power.

Moreover, the OPC that is simultaneously performed with the actual recording operation (i.e. running OPC) also allows the setting of the optimum recording power associated with the recording laser beam.

Patent document 1: Japanese Patent No. 3159454

DISCLOSURE OF INVENTION

Subject to be Solved by the Invention

However, the upper limit value of the variable recording power is a fixed value in the calibration process, so that the recording is performed with an excessive recording power that exceeds the detectable limit of a push-pull signal in some recording media to be used, and this may interfere with a system operation, which is technically problematic. Moreover, in an apparatus of such a type that the recording is started with a relatively large recording power as an initial value and that the calibration is performed with the recording power reduced sequentially, not only the upper limit value of the recording power but also the recording power as the initial value likely exceed the detectable limit of the push-pull signal in the first place.

In view of the aforementioned problems, it is therefore an object of the present invention to provide an information recording apparatus and method which can preferably determine the optimum power when the data is recorded onto the information recording medium, such as an optical disc, and a computer program which makes a computer function as the information recording apparatus.

Means for Solving the Subject

The above object of the present invention can be achieved by an information recording apparatus provided with: a recording device for recording information onto an information recording medium by irradiating the information recording medium with a recording laser beam whose power can be adjusted; a controlling device for controlling the recording device to record calibration data by irradiating the information recording medium with the recording laser beam in which the power is adjusted gradually; a detecting device for detecting a push-pull signal in an area in which the calibration data is recorded on the information recording medium, every time the power is gradually adjusted by the control of the controlling device; an ending device for ending the irradiation of the recording laser beam by the control of the controlling device in a case where the push-pull signal detected by the detecting device exceeds a predetermined range; and a determining device for determining an optimum power for recording the information, on the basis of a reproduction signal obtained by reading the calibration data after the irradiation of the recording laser beam is ended by the control of the ending device.

The above object of the present invention can be also achieved by an information recording method provided with: a recording process of recording information onto an information recording medium by irradiating the information recording medium with a recording laser beam whose power can be adjusted; a controlling process of controlling the recording process to record calibration data by irradiating the information recording medium with the recording laser beam in which the power is adjusted gradually; a detecting process of detecting a push-pull signal in an area in which the calibration data is recorded on the information recording medium, every time the power is gradually adjusted by the control of the controlling process; an ending process of ending the irradiation of the recording laser beam by the control of the controlling process in a case where the push-pull signal detected by the detecting process exceeds a predetermined range; and a determining process of determining an optimum power for recording the information, on the basis of a reading signal obtained by reading the calibration data after the irradiation of the recording laser beam is ended by the control of the ending process.

The above object of the present invention can be also achieved by a computer program for making a computer function as: a recording device for recording information onto an information recording medium by irradiating the information recording medium with a recording laser beam whose power can be adjusted; a controlling device for controlling the recording device to record calibration data by irradiating the information recording medium with the recording laser beam in which the power is adjusted gradually; a detecting device for detecting a push-pull signal in an area in which the calibration data is recorded on the information recording medium, every time the power is gradually adjusted by the control of the controlling device; an ending device for ending the irradiation of the recording laser beam by the control of the controlling device in a case where the push-pull signal detected by the detecting device exceeds a predetermined range; and a determining device for determining an optimum power for recording the information, on the basis of a reproduction signal obtained by reading the calibration data after the irradiation of the recording laser beam is ended by the control of the ending device.

BRIEF DESCRIPTION OF DRAWINGS

FIG. 1 is a block diagram conceptually showing the basic structure of an example of the information recording apparatus of the present invention.

FIG. 2 is a flowchart conceptually showing an overall flow of an operation example of the information recording apparatus of the present invention.

FIG. 3 is a block diagram conceptually showing the basic structure in a circuit example of a push-pull detection device in the information recording apparatus of the present invention.

FIG. 4 is a graph example showing a relation between a recording power and a push-pull amplitude in the circuit example of the push-pull detection device in the information recording apparatus of the present invention.

FIG. 5 is a conceptual view showing the structure of a data recording area for judging that calibration data is recorded onto an information recording medium in the example of the information recording apparatus of the present invention.

DESCRIPTION OF REFERENCE CODES 101 spindle motor
102 optical pickup
103 control device
104 memory
105 information recording device
106 signal adjustment device
107 push-pull detection device
108 information reproducing device
109 recording quality judgment device
201 push-pull amplitude detection circuit
202 unrecorded push-pull input device
203 comparison circuit
204 push-pull signal
205 unrecorded push-pull amplitude
301 OPC area
302a, b unit OPC area
303 calibration area
304a, b determination area

BEST MODE FOR CARRYING OUT THE INVENTION

Hereinafter, as the best mode for carrying out the present invention, an explanation will be given on an information recording apparatus and method, and a computer program in embodiments of the present invention.

An embodiment of the information recording apparatus of the present invention is an information recording apparatus provided with: a recording device for recording information onto an information recording medium by irradiating the information recording medium with a recording laser beam whose power can be adjusted; a controlling device for controlling the recording device to record calibration data by irradiating the information recording medium with the recording laser beam in which the power is adjusted gradually; a detecting device for detecting a push-pull signal in an area in which the calibration data is recorded on the information recording medium, every time the power is gradually adjusted by the control of the controlling device; an ending device for ending the irradiation of the recording laser beam by the control of the controlling device in a case where the push-pull signal detected by the detecting device exceeds a predetermined range; and a determining device for determining an optimum power for recording the information, on the basis of a reproduction signal obtained by reading the calibration data after the irradiation of the recording laser beam is ended by the control of the ending device.

According to the embodiment of the information recording apparatus of the present invention, it is possible to record various content information including video information, music information, data information for computer, and the like.

Particularly in the embodiment, when the information recording apparatus irradiates the information recording medium with the recording laser beam to record the information, the controlling device records the calibration data by irradiating the information recording medium with the recording laser beam in which the power is adjusted gradually. Moreover, in the case where the push-pull signal detected by the detecting device exceeds the predetermined range, the ending device ends the recording of the calibration data by the irradiation of the recording laser beam. Then, on the basis of the recording quality, such as a jitter and degree of modulation, obtained from the reproduction signal detected by the irradiation of a reading laser beam (in other words, a reading signal obtained by reading the recorded calibration data), the determining device determines the optimum power of the laser beam when the information is recorded.

Here, the "calibration data" indicates test-writing data (e.g. OPC data or the like) recorded to determine the optimum power when the information is recorded. Moreover, the "optimum power" indicates the power of the recording laser beam that is most appropriate or almost appropriate for the recording of the information.

Moreover, the "push-pull signal" is a signal indicates the difference in the outputs from the respective divided detectors when the reading laser beam is irradiated to the information recording medium such as an optical disc, and the reproducing signal obtained from the returned light which is reflected and diffracted is detected by the divided detectors. By detecting the push-pull signal, tracking control or the like can be performed, and as a result, it is possible to read the information recorded on the information recording medium.

As a result, according to the embodiment of the information recording apparatus of the present invention, when the optimum power of the recording laser beam is determined (specifically, for example, in the OPC), the reproduction signal is detected by applying the reading laser beam after applying the recording laser beam, and the optimum power is determined on the basis of the detection result. In particular, in order to control the ending device to end the recording of the calibration data if the push-pull signal included in the reproduction signal in the data area recorded by the recording laser beam with the recording power exceeds the predetermined range when the calibration data is recorded with the recording power of the recording laser beam changed gradually, as detailed later, it is possible to record the calibration area at the level that the push-pull signal detected from the reproduction signal does not interfere with the operation of the information recording apparatus. Thus, it is possible to control the recording of the calibration data not to be performed at an inappropriate level. Moreover, without placing an unnecessary burden on the recording apparatus, the optimum power can be determined, safely and quickly. As a result, the information can be recorded with a more preferable power, and for example, a recording error and a reproduction error in the reproduction of the information can be reduced.

In one aspect of the embodiment, the detecting device detects each of the push-pull signal in the area in which the calibration data is recorded and the push-pull signal in an area in which the information is not recorded when detecting the push-pull signal, and the case where the push-pull signal detected by the detecting device exceeds the predetermined range is a case where a ratio between an amplitude of the push-pull signal in the area in which the calibration data is recorded and an amplitude of the push-pull signal in the area in which the calibration data and the information are not recorded exceeds an acceptable range according to the predetermined range.

There can be the information recording medium in which the amplitude of the push-pull signal greatly varies depending on the power when the information is recorded. In the information recording medium, too many variations in the amplitude of the push-pull signal likely make it hard to preferably perform the tracking control. In this aspect, however, even if the amplitude of the push-pull signal greatly varies by recording the calibration data (or information) (in other words, even if it varies with respect to the amplitude of the push-pull signal in the unrecorded area), it is possible to end the recording of the calibration data in consideration of the amplitude of the push-pull signal which varies. More specifically, for example, it is possible to end the recording of the calibration data before the variations in the amplitude of the push-pull signal have an adverse effect on the tracking control. Thus, even if the amplitude of the push-pull signal greatly varies, the calibration data can be recorded with the power that allows stable tracking control. In other words, the calibration data can be recorded at the level that the push-pull signal detected from the reproduction signal does not interfere with the operation of the information recording apparatus. As a result, without placing an unnecessary burden on the recording apparatus, the optimum power can be determined, quickly.

In this aspect, the case where the ratio exceeds the acceptable range may be a case where the ratio exceeds plus/minus (+/−) 6 dB.

By virtue of such construction, the calibration data can be recorded with the power that the ratio between the amplitude of the push-pull signal in the area in which the calibration data is recorded (i.e. recorded area) and the amplitude of the push-pull signal in the area in which the information, such as the calibration data, is not recorded (i.e. unrecorded area) is within plus/minus (+/−) 6 dB. Thus, the calibration data can be recorded with the power that allows the stable tracking control. In other words, considering that the stable tracking control is hardly performed if the ratio between the amplitude of the push-pull signal in the recorded area and the amplitude of the push-pull signal in the unrecorded area exceeds plus/minus (+/−) 6 dB, it is possible to record the calibration data with the power that allows the stable tracking control.

In this aspect, the case where the ratio exceeds the acceptable range may be a case where the ratio exceeds plus/minus (+/−) 3 dB.

By virtue of such construction, in the sense of allowing for the stability in the tracking control, the aforementioned condition that "the ratio exceeds plus/minus (+/−) 6 dB" is changed to the strict condition that "the ratio exceeds plus/minus (+/−) 3 dB". Thus, the calibration data can be recorded with the power that allows more stable tracking control.

In one aspect of the embodiment, the information recording medium allows reflectance to be increased by recording the information, and the case where the push-pull signal exceeds the predetermined range is a case where the push-pull signal detected by the detecting device exceeds a reading limit level of the push-pull signal.

According to this aspect, the information recording medium allows the reflectance to be increased by recording the information, and the amount of the reflected returned light is increased with respect to the amount of the irradiated recording laser beam.

The reading limit level of the push-pull signal indicates the intensity level of the push-pull signal in which increasing the recording power causes a too small push-pull signal (i.e. too much difference from the amplitude of the push-pull signal in the unrecorded area), thereby making the tracking control unstable and thus making it hard or impossible to read the information recorded on the information recording medium.

Here, if the reading limit level of the push-pull signal is set in advance, the calibration data can be recorded, with the power of the recording laser power changed in the range that allows the reading of the recorded data.

As a result, when the calibration data is recorded onto the information recording medium in this aspect, the calibration data can be recorded at the level that the push-pull signal does not interfere with the operation of the information recording apparatus.

In one aspect of the embodiment, the information recording medium allows reflectance to be increased when the information is recorded.

According to this aspect, in the information recording medium in the embodiment, the reflectance is increased by recording the information, and the amount of the returned light which is reflected with respect to the amount of the recording laser beam irradiated is increased.

Moreover, as an aspect of this information recording apparatus, the controlling device may control the recording device to record the calibration data by using the recording laser beam with one power and then record the calibration data by using the recording laser beam with another power, which is greater than or equal to the one power, when the power is adjusted gradually.

By virtue of such construction, by adjusting the amount of the recording laser beam from the low power side, it is possible to detect the reading limit level of the push-pull signal in the adjustment process. As a result, it is possible to avoid such a situation that a failure in the detection of the push-pull signal interferes with a tracking operation due to the irradiation with a high power which is less than or equal to the reading limit level of the push-pull signal from the beginning.

Moreover, by ending the recording of the calibration data when the reading limit level of the push-pull signal is detected, it is unnecessary to record the calibration data in an unnecessary power range which is inappropriate for the recording of the information. Thus, it is possible to shorten the process of recording the calibration data for determining the optimum power.

Moreover, the controlling device may end the recording of the calibration data and then irradiate again an area on the information recording medium that is adjacent to an area in which the calibration data is recorded, with a power that is less than or equal to a power immediately before the recording of the calibration data is ended.

By virtue of such construction, it is possible to make a data recording area for judging that the calibration data is recorded in the area that is adjacent to the area in which the calibration data is recorded, and this facilitates the detection of an area in which the calibration data has not been recorded yet. In particular, if the calibration data is recorded to increase the power sequentially, it is likely hard to distinguish between the area with the calibration data recorded and the area that is adjacent to the aforementioned area and in which the calibration data has not been recorded yet, because the calibration data is recorded with the lowest power at the beginning. Thus, it is possible to clearly identify the edge of the area in which the calibration data is recorded, by performing the recording to be adjacent to the area in which the calibration data is recorded at the beginning, with the power that is less than or equal to the power immediately before the recording of the calibration data is ended (i.e. the highest power). The recording of the data for identifying the area with the calibration data recorded may be performed with a power that is less than or equal to the power when the calibration data is recorded last time and that can realize a detectable amplitude. Moreover, the recording may be performed not only with the same power but also with a plurality of powers.

In another aspect of the embodiment, the information recording apparatus is further provided with: a judging device for judging whether or not recording quality of the information recorded by using the recording laser beam with the optimum power determined by the determining device is at an acceptable level; and a modifying device for adjusting a recording pulse of the recording laser beam if it is judged that the recording quality is not at the acceptable level.

According to this aspect, when the information is recorded with the determined optimum power of the recording laser beam, if the recording quality of the information is not at the acceptable level, then, the recording quality of the information is corrected by adjusting the recording pulse.

Here, "adjusting the recording pulse" is adjusting either or both of the pulse width and pulse intensity of the pulse in the recording of the information including a pulse train. When the information is recorded by using the recording laser beam, the shape of a pit on the information recording medium formed by the irradiation of the recording laser beam is influenced not only by the power of the recording laser beam but also by the reflectance and sensitivity of the information recording medium. In the embodiment, the recording quality can be kept preferable by adjusting the recording pulse after the determination of the optimum power of the recording laser beam.

Alternatively, in an aspect in which the information recording apparatus is provided with the modifying device, the controlling device controls the recording device to record the calibration data again after the adjustment of the recording pulse of the recording laser beam on the modifying device.

By virtue of such construction, even if the optimum power in the information recording is changed by adjusting the recording pulse of the recording laser beam, it is possible to determine the optimum power after the change by recording the calibration data again.

An embodiment of the information recording method of the present invention is an information recording method provided with: a recording process of recording information onto an information recording medium by irradiating the information recording medium with a recording laser beam whose power can be adjusted; a controlling process of controlling the recording process to record calibration data by irradiating the information recording medium with the recording laser beam in which the power is adjusted gradually; a detecting process of detecting a push-pull signal in an area in which the calibration data is recorded on the information recording medium, every time the power is gradually adjusted by the control of the controlling process; an ending process of ending the irradiation of the recording laser beam by the control of the controlling process in a case where the push-pull signal detected by the detecting process exceeds a predetermined range; and a determining process of determining an optimum power for recording the information, on the basis of a reading signal obtained by reading the calibration data after the irradiation of the recording laser beam is ended by the control of the ending process.

According to the embodiment of the information recording method of the present invention, it is possible to receive the same various effects as those of the aforementioned embodiment of the information recording apparatus of the present invention.

Incidentally, the embodiment of the information recording method of the present invention can also adopt the same various aspects in the embodiment of the information recording apparatus of the present invention described above.

An embodiment of the computer program of the present invention is a computer program for making a computer function as: a recording device for recording information onto an information recording medium by irradiating the information recording medium with a recording laser beam whose power can be adjusted; a controlling device for controlling the recording device to record calibration data by irradiating the information recording medium with the recording laser beam in which the power is adjusted gradually; a detecting device for detecting a push-pull signal in an area in which the calibration data is recorded on the information recording medium, every time the power is gradually adjusted by the control of the controlling device; an ending device for ending the irradiation of the recording laser beam by the control of the controlling device in a case where the push-pull signal detected by the detecting device exceeds a predetermined range; and a determining device for determining an optimum power for recording the information, on the basis of a reproduction signal obtained by reading the calibration data after the irradiation of the recording laser beam is ended by the control of the ending device.

According to the computer program of the present invention, the aforementioned embodiment of the information recording apparatus of the present invention can be relatively easily realized as a computer provided in the motion picture editing apparatus reads and executes the computer program from a program storage device, such as a ROM, a CD-ROM, a DVD-ROM, and a hard disk, or as it executes the computer program after downloading the program through a communication device.

Incidentally, in response to the various aspects in the embodiment of the information recording apparatus of the present invention described above, the embodiment of the computer program of the present invention can also adopt various aspects.

The operation and other advantages in the embodiment will become more apparent from the example explained below.

As explained above, according to the embodiment of the information recording apparatus of the present invention, it is provided with the recording device, the controlling device, the detecting device, the ending device, and the determining device. According to the embodiment of the recording method of the present invention, it is provided with the recording process, the controlling process, the detecting process, the ending process, and the determining process. According to the embodiment of the computer program of the present invention, it makes a computer function as the recording device, the controlling device, the detecting device, the ending device, and the determining device. Therefore, it is possible to provide an information recording apparatus and method which can preferably determine the optimum power when the data is recorded onto the information recording medium, such as an optical disc, and a computer program which makes a computer function as the information recording apparatus.

EXAMPLE

Structure Example

The structure example of the information recording apparatus in an example of the present invention will be explained with reference to FIG. 1. Incidentally, the same constituent elements in the drawings will carry the same referential numerals. FIG. 1 is a block diagram conceptually showing the basic structure of an example of the information recording apparatus of the present invention.

As shown in FIG. 1, an information recording apparatus 1 in the example is provided with a spindle motor 101, an optical pickup 102, a control device 103, a memory 104, an information recording device 105, a signal adjustment device 106, a push-pull detection device 107, an information reproducing device 108, and a recording quality judgment device 109.

The optical pickup 102 is one specific example of the "recording device" of the present invention. The optical pickup 102 is provided with a semiconductor lens apparatus, various lenses, an actuator, and the like. More specifically, the optical pickup 102 irradiates an optical disc 100 with a laser beam L as reading light with a first power in reproduction. An obtained reproduction signal is passed to the information reproducing device 108 to reproduce the data. On the other hand, the optical pickup 102 irradiates the optical disc 100 with the laser beam L as writing light with a second power and with it modulated in recording. The power adjustment of the laser beam L is performed under the control of the signal adjustment device 106 which is one example of the "controlling device" described later. More specifically, the irradiation is performed with the laser beam L with a predetermined power by driving the semiconductor laser apparatus by a driving pulse defined by a predetermined pulse strategy.

The spindle motor 101 is constructed to rotate the optical disc 100 at a predetermined speed, under spindle servo provided by a not-illustrated servo circuit or the like. Moreover, the optical disc 102 is constructed to be displaced in the radial direction of the optical disc 100 or the like by the not-illustrated servo circuit or the like. As a result, various data can be recorded by applying the laser beam L at a desired recording position on the optical disc 100.

The signal recording device 105 is one example of the "controlling device" in the structure example of the present invention. The signal recording device 105 drives the semiconductor laser disposed in the optical pickup 102 in order to detect the optimum power of the laser beam by processes of recording and reproducing calibration data, such as an OPC pattern, in an OPC process described later. After that, in the data recording, the signal recording device 105 is constructed to drive the semiconductor laser of the optical pickup 102 with the optimum power detected by the OPC process. In the data recording, the optimum power is modulated in accordance with record data.

The signal adjustment device 106 is constructed to output a signal indicating the calibration data to the information recording device 105 in the recording of the calibration data in the OPC process before a recording operation described later. The information recording device 105 passes the recording signal indicating the calibration data, to the optical pickup 102, by which the calibration data is recorded.

After the recording of the calibration data, the optical pickup 102 irradiates the optical disc 100 with the reading laser beam L, the returned light which is reflected and diffracted is passed to the information reproducing device 108, and the calibration data is reproduced. Here, the optimum amount of light for data recording is determined from a jitter or the like included in the reproduction signal.

It can be also constructed such that a recording compensation process detailed later is performed after the optimum power is determined. In the recording compensation process, after the data is recorded with the determined optimum power, the recorded data is reproduced, and the reproduction signal is judged, thereby adjusting the pulse strategy which is an element other than the power of the recording laser beam L. Specifically, the recording quality judgment device 109 judges whether or not a recording quality, such as a jitter amount, included in the reproduction signal passed to the information reproducing device 108 is at an acceptable level. If it is judged to be less than or equal to the acceptable level, the pulse strategy of the record data is adjusted on the signal adjustment device 106.

Incidentally, in the information recording apparatus 1 shown in FIG. 1, in order to give a simpler explanation on the characteristics of the example of the present invention, constituent features required for the structure example are extracted and illustrated. Thus, it is acceptable to provide the constituent features other than the aforementioned constituents.

Operation Example

Next, with reference to a flowchart in FIG. 2, an explanation will be given on the details of the OPC process of the information recording apparatus as constructed above.

When the optical disc 100 is loaded on the spindle motor 101, a seek operation is performed by the optical pickup 102 under the control of the control device 103, thereby obtaining various management data necessary for the recording process to be performed on the optical disc 100. On the basis of the management data, the data is recorded onto the optical disc 100 through the information recording device 105 in accordance with an instruction from external input equipment or the like, by the control of the control device 103. Then, the OPC process is performed as the calibration of the recording laser power before the recording of the data.

Firstly, a push-pull amplitude in an unused area in which data is not recorded on the optical disc 100 loaded on the spindle motor 101, i.e. an unrecorded push-pull amplitude, is obtained (step S101). Here, the detection of the push-pull amplitude includes such a method that the optical disc 100 is irradiated with the laser beam L, that the returned light which is reflected and diffracted is received by the optical pickup 102 and detected by a not-illustrated light detector, and that a difference in output in each divided portion of the detector is calculated. The obtained unrecorded push-pull amplitude is stored in the memory 104 at least during the OPC process performed on the optical disc 100. Then, one particular power of the laser beam L for recording the calibration data is set by the signal adjustment device 106 (step S102).

Incidentally, in the example, it is assumed that the optical disc 100 in which the reflectance is increased by recording the data (i.e. by applying the laser beam L) (so-called L to H media) is used. In this case, the one particular power of the laser beam L set in the step S102 is the power of the laser beam L to the extent that does not exceed the amplitude limit value of a push-pull signal which allows the recorded information to be read and a relatively low power. Moreover, as detailed later, the calibration data is recorded with the power of the laser beam L increased sequentially, in the OPC process.

However, obviously, it may be constructed such that the optical disc 100 in which the reflectance is reduced by recording the data (i.e. by applying the laser beam L) is used. In other words, it is a case where the power of the laser beam L set in the step S102 is the power of the laser beam L to the extent that does not exceed the amplitude limit value of a push-pull signal which allows the recorded information to be read and a relatively high power. Moreover, in this case, the calibration data is recorded with the power of the laser beam L reduced sequentially, in the OPC process.

Then, the one particular power of the laser beam L which is set is passed to the information recording device 105, and under the control of the information recording device 105, the calibration data is recorded onto the optical disc 100 with the one particular power (step S103).

If the recording of the calibration data with the one particular power in a predetermined area is ended, then, a push-pull amplitude in the area, i.e. a recorded push-pull amplitude, is obtained (step S104). Then, it is judged whether or not the obtained recorded push-pull amplitude itself, or a ratio between the recorded push-pull amplitude and the unrecorded push-pull signal exceeds a push-pull acceptable limit value set in advance (step S105).

Incidentally, in the example, as the push-pull acceptable limit value, "plus/minus (+/−) 6 dB" is used as one example. For example, if the ratio between the recorded push-pull amplitude and the unrecorded push-pull amplitude exceeds plus/minus (+/−) 6 dB, it is judged that the ratio between the recorded push-pull amplitude and the unrecorded push-pull amplitude exceeds the push-pull acceptable limit value. Preferably, in the example, as the push-pull acceptable limit value, "plus/minus (+/−) 3 dB" is used as one example. For example, if the ratio between the recorded push-pull amplitude and the unrecorded push-pull amplitude exceeds plus/minus (+/−) 3 dB, it is judged that the ratio between the recorded push-pull amplitude and the unrecorded push-pull amplitude exceeds the push-pull acceptable limit value.

Moreover, in one optical disc 100, generally, the unrecorded push-pull amplitude in the unused area in which various data, such as the calibration data, is not recorded does not change. Thus, in view of the unrecorded push-pull amplitude, the acceptable limit value of the recorded push-pull amplitude itself may be determined. Alternatively, as described above, the amplitude limit value of the push-pull signal which allows the recorded information to be read may be determined as the acceptable limit value of the recorded push-pull amplitude itself.

If the recorded push-pull amplitude does not exceed the acceptable limit value (the step S105: No), the control device 103 is notified of the result by the push-pull detection device 107, and the information recording device 105 increases the power of the recording laser beam L under the control of the control device 103 (step S106). When the power of the laser beam L is increased, a predetermined amount may be used for the increase amount in one operation. After the power of the laser beam L is increased, the recording of the calibration data is performed again with the power (the step S103).

On the other hand, if the push-pull amplitude exceeds the acceptable limit value (the step S105: Yes), the control device 103 is notified of the result by the push-pull detection device 107, and the information recording device 105 ends the recording of the calibration data, under the control of the control device 103 (step S107). According to this operation, when or before it becomes hard or impossible to read the information recorded on the optical disc 100 due to a too small push-pull signal, the recording of the calibration data can be ended. As a result, it is possible to achieve such a marked effect that the calibration data can be stably recorded by not performing the recording in an area which allows an excess of the reading limit level of the push-pull signal.

After the end of the recording, the power of the laser beam L used in an area which provides the smallest jitter amount in the reproduction signal in an area on the optical disc 100 in which the calibration data is recorded by adjusting the power gradually is determined as the optimum power (step S108). Specifically, the optimum power is determined by detecting the jitter amount from the reproduction signal obtained by irradiating the area in which the calibration data is recorded, with the reading laser beam L. The process of detecting the jitter amount may be performed on the entire area after the recording of the calibration data is ended. Alternatively, in the process of detecting the push-pull amplitude in each power, the jitter amounts in the powers may be detected simultaneously, stored in the memory 104, and compared later. For example, an error rate, degree of modulation, or asymmetry may be used as an index, instead of the jitter amount.

It may be or may not be also constructed such that the recording compensation process in which the pulse strategy of the data for recording is adjusted to achieve the appropriate recording quality is performed after the optimum power is determined. In the recording compensation process, firstly, the data is recorded by using the laser beam L with the optimum power, and at the same time, the recorded data reproduced, and the reproduction signal is passed to the information reproducing device 108 (step S109). Then, it is judged on the recording quality judgment device 109 whether or not the recording quality of the data is at the acceptable level (step S110). If the judgment result does not achieve the acceptable level of the recording quality (the step S110: No), the correction of the pulse strategy (e.g. the correction of at least one of the pulse width and the amplitude of the pulse strategy) is performed on the signal adjustment device 106 (step S111). Incidentally, if a change in the amplitude of the pulse strategy changes the power of the laser beam L, resulting in a change in the condition of the optimum power (step S112: Yes), then, the calibration data is recorded again (the step S103), and the optimum power is obtained again. According to this operation, the pulse strategy of the data for recording is corrected on the basis of the determination of a pit shape formed by actually recording the data or the like, so that it is possible to keep the optimum recording quality of the data. Moreover, if the condition for determining the optimum power is changed due to the correction of the pulse strategy, then, the pulse strategy after the correction is used to obtain the optimum power again, by which the marked effect which keeps the preferable recording quality can be obtained.

If the recording quality of the data is within the acceptable level (the step S110: Yes), or if there is no need to obtain the optimum power again after the correction of the pulse strategy (the step S112: No), the determined optimum power and pulse strategy are stored into the memory 104, and the data is recorded on the basis of the optimum power and the pulse strategy under the control of the control device 103.

Examples of Push-Pull Detection Circuit

Next, with reference to FIG. 3 and FIG. 4, an explanation will be given on the details of the detection of the push-pull amplitude in the example (i.e. the push-pull detection device 107). FIG. 3 shows the example of the push-pull detection device 107 in the example, wherein FIG. 3 is a block diagram conceptually showing the basic structure of a circuit for detecting a ratio between the unrecorded push-pull amplitude in the optical disc and the push-pull amplitude in an OPC area recorded by using the laser beam L with the one particular power. FIG. 4 is a graph example showing a relation among the unrecorded push-pull amplitude, the push-pull amplitude in the OPC area, and the jitter amount included in the reproduction signal detected in the OPC area.

The push-pull detection circuit 107 in the circuit example shown in FIG. 3 is provided with a push-pull amplitude detection circuit 201, an unrecorded push-pull amplitude input device 202, and a comparison circuit 203.

By the control of the optical pickup 102 in FIG. 1, when the calibration data recorded on the optical disc 100 is read, a push-pull signal 204 is inputted to the push-pull detection device 107.

Then, on the push-pull amplitude detection circuit 201, the amplitude of the push-pull signal 204 (i.e. the recorded push-pull amplitude) is detected and sent to the comparison circuit 203. Moreover, an unrecorded push-pull amplitude 205 in the optical disc 100, which is obtained in the step S101 in FIG. 2 and which is stored in the memory 104, is also sent to the comparison circuit 203 through the unrecorded push-pull input device 202.

On the comparison circuit 203, the ratio between the recorded push-pull amplitude and the unrecorded push-pull amplitude is calculated and outputted to the control device 103.

With reference to the graph example shown in FIG. 4, an explanation will be given on the push-pull amplitude. The upper part of the graph shows the recorded push-pull amplitude with respect to the recording power, the unrecorded push-pull amplitude, and the jitter amount (i.e. a shift amount in a time axis direction of the recording pulse). Incidentally, the unrecorded push-pull amplitude is the push-pull amplitude in an area on the optical disc 100 which is not irradiated with the recording laser beam L, so that it is assumed to be constant, regardless of the magnitude of the recording power. For hits reason, the recorded push-pull amplitude shown in FIG. 4 may be a ratio with respect to an unrecorded push-pull value. As shown in FIG. 4, as the power increases, the recorded push-pull amplitude decreases.

An operation of calibrating the power by the OPC using this circuit example will be explained. Firstly, in the calibration of the power by the OPC, starting from a power low enough to obtain the push-pull signal level which is at least greater than or equal to a detectable limit value, the recording of the calibration data with one particular power and the detection of the recorded push-pull amplitude in the area in which the calibration data is recorded are performed, and until the detected recorded push-pull amplitude exceeds the push-pull acceptable limit value, the recording is performed with the recording power increased sequentially and gradually, as shown in the lower part of FIG. 4 (the step S103 to the step S106 in FIG. 2). If the detected recorded push-pull amplitude exceeds the push-pull acceptable limit value, the process of recording the calibration data is ended (the step S107 in FIG. 2).

Then, in the area in which the calibration data is recorded, a value which provides the smallest jitter amount is determined as the optimum power (the step S108 in FIG. 2). According to this operation, it is possible to determine the optimum power which provides the smallest jitter amount while recording the calibration data in the range that does not exceed the detection limit of the push-pull signal level.

Example of Judgment of Calibration Area

By using FIG. 5, an explanation will be given on an operation of forming a data recording area for judging that the calibration data is recorded on the information recording medium. FIG. 5 is a conceptual view showing an information recording area when the calibration data is recorded onto an OPC area 301 on the optical disc 100. As shown in FIG. 5, an OPC area 302 in which the calibration data is recorded on the optical disc 100 is provided with a calibration area 303 in which the calibration data is recorded; and a judgment area 304 which is adjacent to the area with the calibration data recorded and in which judgment data is recorded, wherein the judgment data indicates that the calibration data is recorded (in other words, the judgment data indicates a boundary between the area with the calibration data recorded and an area with no calibration data recorded).

Next, an explanation will be given on the operation of recording the calibration data and the judgment data. Firstly, in the OPC area 301 of the optical disc 100 shown in FIG. 5, an unused area in which the data is not recorded is sought from a front edge in a spiral direction (hereinafter simply referred to as the front edge) to a rear edge. If no data is recorded on the OPC area 301, i.e. if the OPC is performed for the first time, the rearmost edge of the OPC area 301 is sought.

The recording of the calibration data into the sought unused area is performed on a certain area from the front edge side of the OPC area 301. The size of the area may be determined in advance, and it is set not to exceed the rear edge of the recording area. Moreover, in the example, the recording of the calibration data is performed from the low power side, and the power increases sequentially and gradually as the recording proceeds to the rear edge side. Incidentally, in the calibration area 303 (or a judgment area) in FIG. 5, the recorded data is shown by a monotone drawing which becomes relatively dark as the recording is performed with a relatively high power.

If the recording of the calibration data is ended, then, as shown in the middle part of FIG. 5, the judgment data is recorded into the unused area which is adjacent to the front edge side of the calibration area 303, with a power that is lower than the power when the recording of the calibration data is ended and that allows the recorded area to be detected by the information reproducing device 108. The recording of the judgment data is performed from the front edge side of the OPC area 301 to the rear edge side in order not to overlap the calibration area 303. At this time, there may be a space left in which the data is not recorded between the calibration area 303 and the judgment area 304. The calibration area 303 generated by the recording and a judgment area 304a in which the judgment data is recorded are collectively referred to as a unit OPC area 302a. Incidentally, the unit OPC area 302a indicates, in effect, an area in which the calibration data is recorded by one OPC. The aforementioned OPC area 301 preferably has a size large enough to be provided with a plurality of unit OPC areas 302a therein.

Moreover, in the recording of the judgment data, it is only necessary to satisfy such conditions that the power is lower than the power when the recording of the calibration data is ended and that the power allows the recorded area to be detected by the information reproducing device 108. For example, as shown in the lower part of FIG. 5, not only the recording with the same power but also the recording with the recording power changed may be performed. At this time, in the example, the recording is performed from the high power side, and the power decreases sequentially and gradually as the recording proceeds to the rear edge side. The judgment area 304b is one example of the above situation, and the recording is performed with a power that is lower than the power when the recording of the calibration data is ended and with the power reduced sequentially.

As described above, in recording the calibration data, the unused area is sought from the front edge of the OPC area 301 to the rear edge. Here, if the calibration data is recorded multiple times on one optical disc 100, then, the next calibration data is recorded on the front edge side of the firstly detected judgment area 304a because the judgment area 304a always exists on the rearmost edge of the unrecorded area on the OPC area 301.

According to the operations, it is possible to make the judgment areas 304a and 304b for judging that the calibration data is recorded, in the area adjacent to the calibration area 303, which facilitates the detection of the area in which the calibration data has not been recorded. In particular, if the calibration data is recorded in order to increase the power sequentially, it is likely hard to distinguish between the generated calibration area 303 and the unused area adjacent to the calibration area 303 because the calibration data is recorded with the lowest power at the beginning. Thus, it is possible to clearly identify the edge of the area in which the calibration data is recorded, by performing the recording to be adjacent to the area in which the calibration data is recorded at the beginning, with the power that is less than or equal to the power immediately before the recording of the calibration data is ended (i.e. the highest power). This effect is remarkable when the OPC process is performed multiple times.

The present invention is not limited to the aforementioned examples, but various changes may be made, if desired, without departing from the essence or spirit of the invention which can be read from the claims and the entire specification. An information recording medium, an information recording apparatus and method, and a computer program for recording control, all of which involve such changes, are also intended to be within the technical scope of the present invention.

The invention claimed is:

1. An information recording apparatus comprising:
   a recording device for recording information onto an information recording medium by irradiating the information recording medium with a recording laser beam whose power can be adjusted;
   a controlling device for controlling the recording device to record calibration data by irradiating the information recording medium with the recording laser beam in which the power is adjusted gradually;
   a detecting device for detecting a push-pull signal in an area in which the calibration data is recorded on the information recording medium, every time the power is gradually adjusted by the control of the controlling device;
   an ending device for ending the irradiation of the recording laser beam by the control of the controlling device in a case where the push-pull signal detected by the detecting device exceeds a predetermined range; and
   a determining device for determining an optimum power for recording the information, on the basis of a reproduction signal obtained by reading the calibration data after the irradiation of the recording laser beam is ended by the control of the ending device.

2. The information recording apparatus according to claim 1, wherein
   the detecting device detects each of the push-pull signal in the area in which the calibration data is recorded and the push-pull signal in an area in which the information is not recorded when detecting the push-pull signal, and
   the case where the push-pull signal detected by the detecting device exceeds the predetermined range is a case where a ratio between an amplitude of the push-pull signal in the area in which the calibration data is recorded and an amplitude of the push-pull signal in the area in which the calibration data and the information are not recorded exceeds an acceptable range according to the predetermined range.

3. The information recording apparatus according to claim 2, wherein the case where the ratio exceeds the acceptable range is a case where the ratio exceeds plus/minus (+/−) 6 dB.

4. The information recording apparatus according to claim 2, wherein the case where the ratio exceeds the acceptable range is a case where the ratio exceeds plus/minus (+/−) 3 dB.

5. The information recording apparatus according to claim 1, wherein the case where the push-pull signal exceeds the predetermined range is a case where the push-pull signal detected by the detecting device exceeds a reading limit level of the push-pull signal.

6. The information recording apparatus according to claim 1, wherein the information recording medium allows reflectance to be increased when the information is recorded.

7. The information recording apparatus according to claim 5, wherein the controlling device controls the recording device to record the calibration data by using the recording laser beam with one power and then record the calibration data by using the recording laser beam with another power, which is greater than or equal to the one power, when the power is adjusted gradually.

8. The information recording apparatus according to claim 7, wherein the controlling device ends the recording of the calibration data and then irradiates again an area on the information recording medium that is adjacent to an area in which the calibration data is recorded, with a power that is less than or equal to a power immediately before the recording of the calibration data is ended.

9. The information recording apparatus according to claim 1, further comprising:
   a judging device for judging whether or not recording quality of the information recorded by using the recording laser beam with the optimum power determined by the determining device is at an acceptable level; and
   a modifying device for adjusting a recording pulse of the recording laser beam if it is judged that the recording quality is not at the acceptable level.

10. The information recording apparatus according to claim 5, wherein the controlling device controls the recording device to record the calibration data again after the adjustment of the recording pulse of the recording laser beam on the modifying device.

11. An information recording method comprising:
    a recording process of recording information onto an information recording medium by irradiating the information recording medium with a recording laser beam whose power can be adjusted;
    a controlling process of controlling the recording process to record calibration data by irradiating the information recording medium with the recording laser beam in which the power is adjusted gradually;
    a detecting process of detecting a push-pull signal in an area in which the calibration data is recorded on the information recording medium, every time the power is gradually adjusted by the control of the controlling process;
    an ending process of ending the irradiation of the recording laser beam by the control of the controlling process in a case where the push-pull signal detected by the detecting process exceeds a predetermined range; and
    a determining process of determining an optimum power for recording the information, on the basis of a reading signal obtained by reading the calibration data after the irradiation of the recording laser beam is ended by the control of the ending process.

12. A computer program product in a computer-readable medium for tangibly embodying a program of instructions executable by a computer for making the computer function as:
- a recording device for recording information onto an information recording medium by irradiating the information recording medium with a recording laser beam whose power can be adjusted;
- a controlling device for controlling the recording device to record calibration data by irradiating the information recording medium with the recording laser beam in which the power is adjusted gradually;
- a detecting device for detecting a push-pull signal in an area in which the calibration data is recorded on the information recording medium, every time the power is gradually adjusted by the control of the controlling device;
- an ending device for ending the irradiation of the recording laser beam by the control of the controlling device in a case where the push-pull signal detected by the detecting device exceeds a predetermined range; and
- a determining device for determining an optimum power for recording the information, on the basis of a reproduction signal obtained by reading the calibration data after the irradiation of the recording laser beam is ended by the control of the ending device.

* * * * *